(12) United States Patent
Carrer Vives et al.

(10) Patent No.: US 12,344,476 B2
(45) Date of Patent: Jul. 1, 2025

(54) BRUSH MODULE FOR CONVEYOR BELTS

(71) Applicant: OPEN MIND VENTURES, S.L.U., Igualada (ES)

(72) Inventors: Josep Maria Carrer Vives, Igualada (ES); Javier Vallès Cuyàs, Igualada (ES); Bernat Balsells Vives, Igualada (ES); Antoni Balsells Mercade, Igualada (ES)

(73) Assignee: OPEN MIND VENTURES, S.L.U., Igualada (ES)

( * ) Notice: Subject to any disclaimer, the term of this patent is extended or adjusted under 35 U.S.C. 154(b) by 8 days.

(21) Appl. No.: 18/554,290

(22) PCT Filed: Mar. 29, 2022

(86) PCT No.: PCT/ES2022/070181
§ 371 (c)(1),
(2) Date: Oct. 6, 2023

(87) PCT Pub. No.: WO2022/214718
PCT Pub. Date: Oct. 13, 2022

(65) Prior Publication Data
US 2024/0286844 A1  Aug. 29, 2024

(30) Foreign Application Priority Data
Apr. 8, 2021 (EP) ..................... 21382294

(51) Int. Cl.
*B65G 15/42* (2006.01)
*F16G 3/10* (2006.01)

(52) U.S. Cl.
CPC ............... *B65G 15/42* (2013.01); *F16G 3/10* (2013.01)

(58) Field of Classification Search
CPC ................ B65G 15/42; B65G 2207/30; B65G 2207/42; F16G 3/10
See application file for complete search history.

(56) References Cited

U.S. PATENT DOCUMENTS 2,091,064 A * 8/1937 Bates ................... A23N 12/005
15/3.21
4,068,029 A * 1/1978 Armstrong ............. B65G 27/04
428/92

(Continued)

FOREIGN PATENT DOCUMENTS

EP    2656987 A1   10/2013
EP    3106411 A1   12/2016

(Continued)

OTHER PUBLICATIONS

International Search Report for PCT/ES2022/070181, Jul. 21, 2022, 3 pgs.

(Continued)

*Primary Examiner* — Mark A Deuble
(74) *Attorney, Agent, or Firm* — Danielson Legal LLC

(57) ABSTRACT

Brush module for conveyor belts (1) a base (5) and a plurality of bristles (4), and also comprises a plurality of complementary protrusions (2) and holes (3) for their engagement with one or more adjacent brush modules (1). Preferably, said holes (3) and protrusions (2) are located in a complementary and opposite manner on additional sections (6) arranged at the ends or sides of the base (5).
It allows providing a brush module in which multiple units of the same can be easily joined together, providing great tensile and shear strength, and that in turn can have complementary thicknesses to facilitate assembly while maintaining the final thickness.

11 Claims, 13 Drawing Sheets

(56) References Cited

U.S. PATENT DOCUMENTS

| | | | | |
|---|---|---|---|---|
| 5,246,100 | A * | 9/1993 | Stone | F16G 3/00 198/844.2 |
| 5,379,882 | A * | 1/1995 | Kuchta | B26D 7/018 198/689.1 |
| 5,802,682 | A * | 9/1998 | Jourde | D04H 18/02 198/803.14 |
| 6,199,686 | B1 * | 3/2001 | Devine | B65G 21/2036 198/836.1 |
| 6,321,903 | B1 * | 11/2001 | Shaffer | B29C 66/7292 198/844.2 |
| 6,516,943 | B2 * | 2/2003 | Engle | F16G 3/00 198/844.2 |
| 6,527,105 | B2 * | 3/2003 | Tarnawskyj | G03G 15/162 24/33 K |
| 7,344,020 | B2 * | 3/2008 | Grywacheski | A01D 61/02 198/844.2 |
| 7,980,979 | B2 * | 7/2011 | Jakob | F16G 3/08 198/844.2 |
| 8,720,675 | B2 * | 5/2014 | Gentz | F16G 3/10 198/844.2 |
| 2018/0223951 | A1 * | 8/2018 | Schroeder | F16G 3/08 |

FOREIGN PATENT DOCUMENTS

| | | |
|---|---|---|
| EP | 3530594 A1 | 8/2019 |
| EP | 3738733 A1 | 11/2020 |

OTHER PUBLICATIONS

Sacema Group, "Conveyor Belt Brushes Systems Conveyor Belt Brushes Systems Alfa," webpage, Aug. 28, 2020, pp. 1-4, XP055838882, retrieved from the Internet: URL:https://sacemagroup.com/wp-content/uploads/2020/08/CONVEYOR-BELT-BRUSHES-SYSTEMS.pdf (retrieved on Sep. 7, 2021).

\* cited by examiner

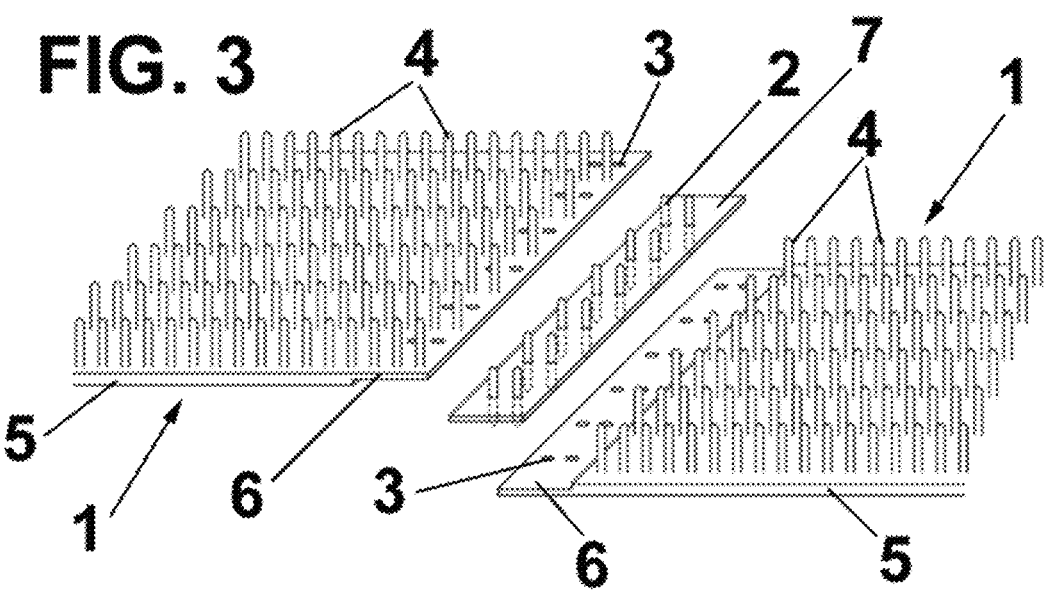

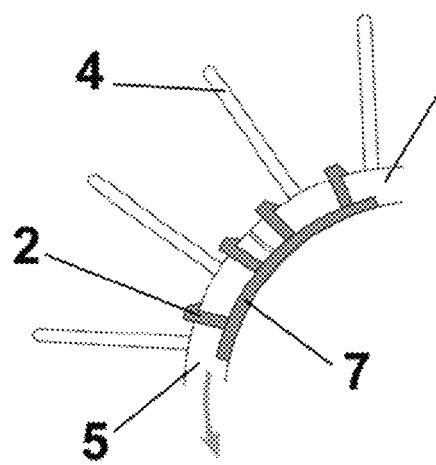
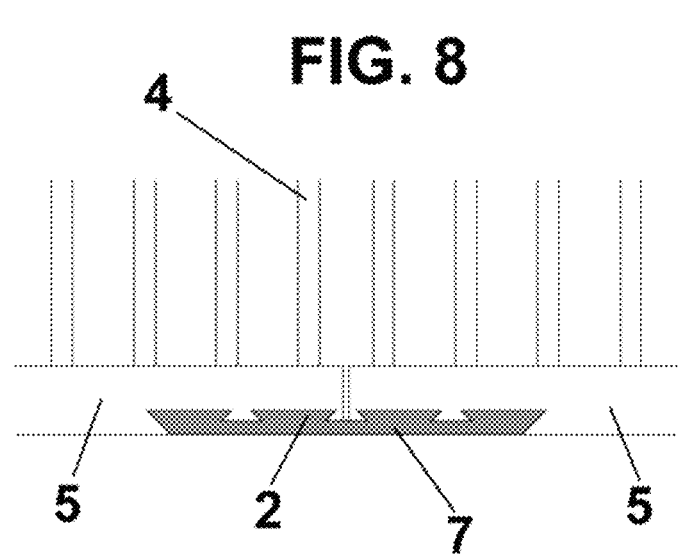
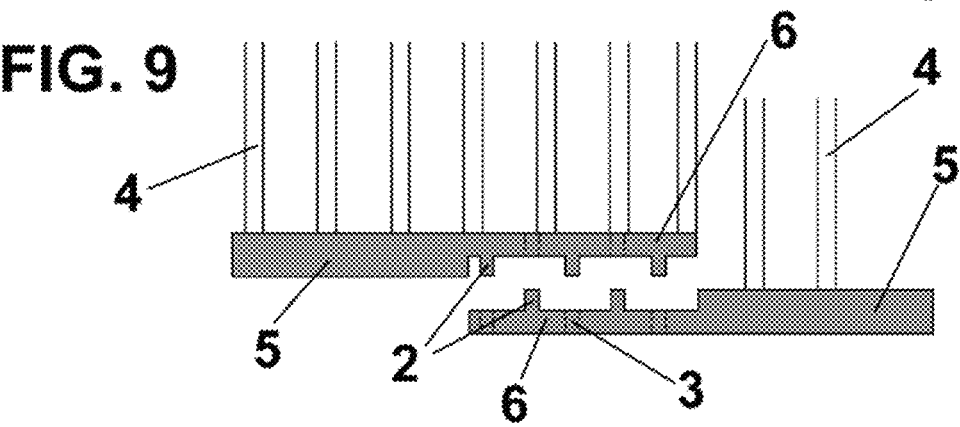
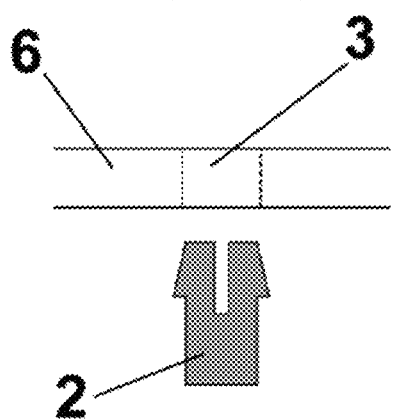
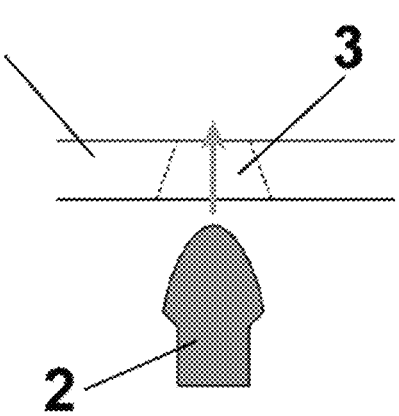

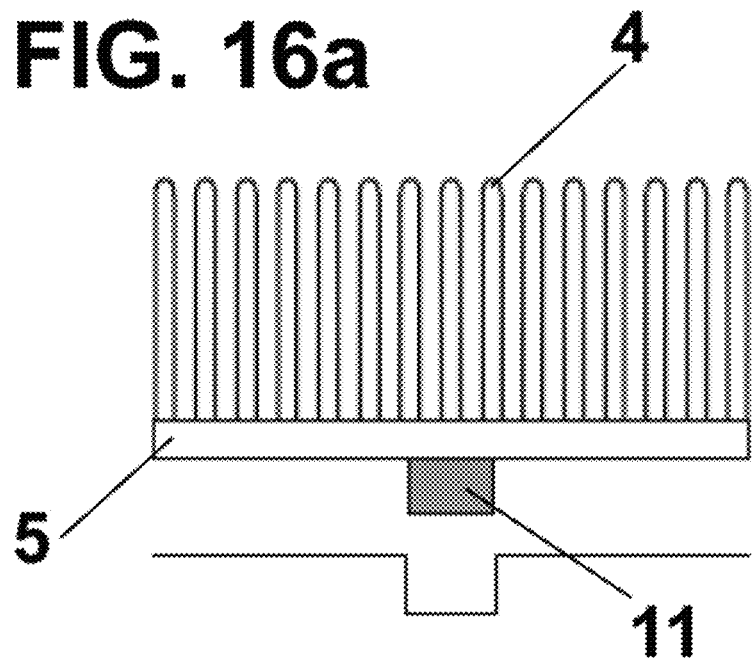
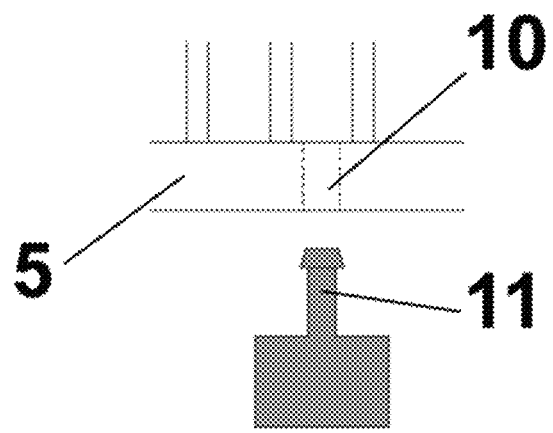

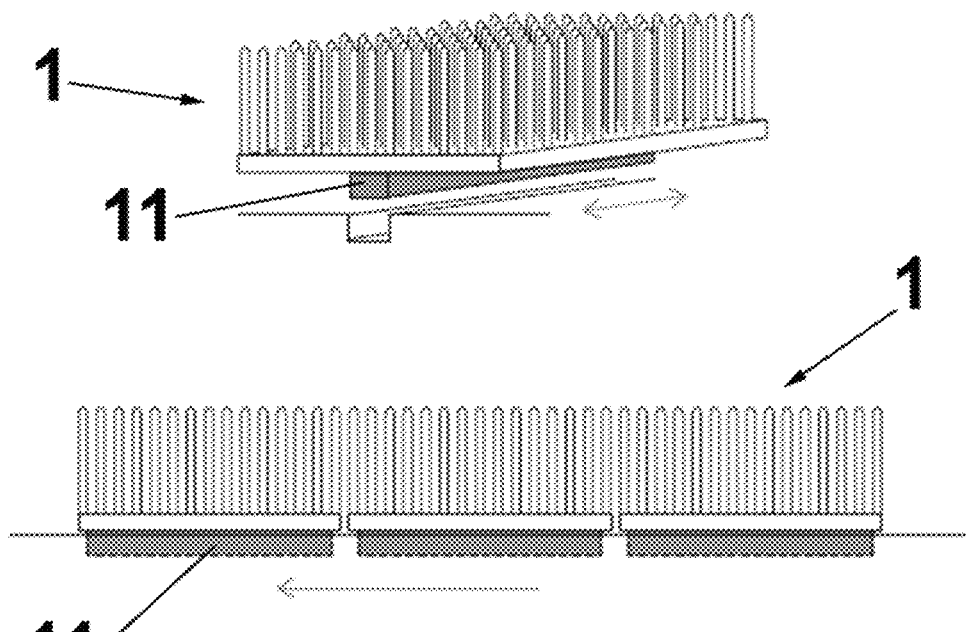

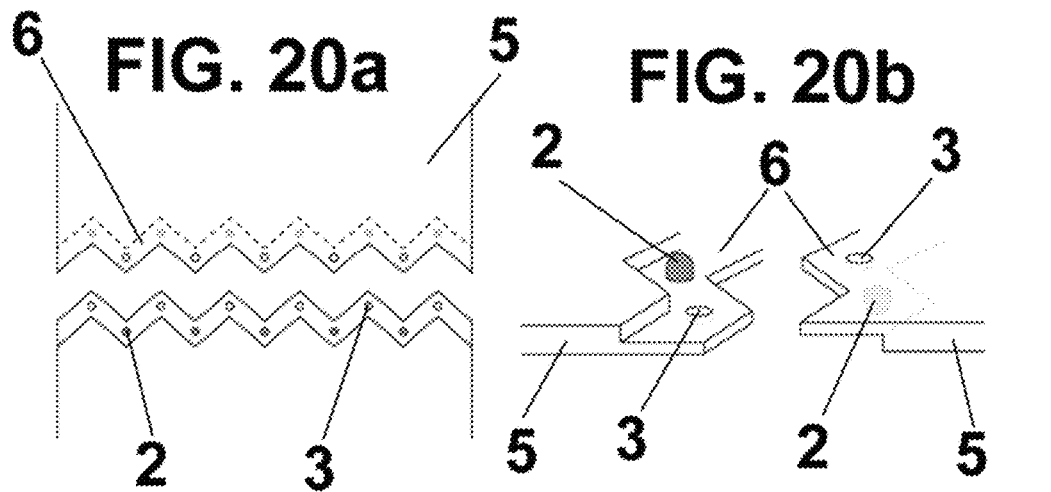
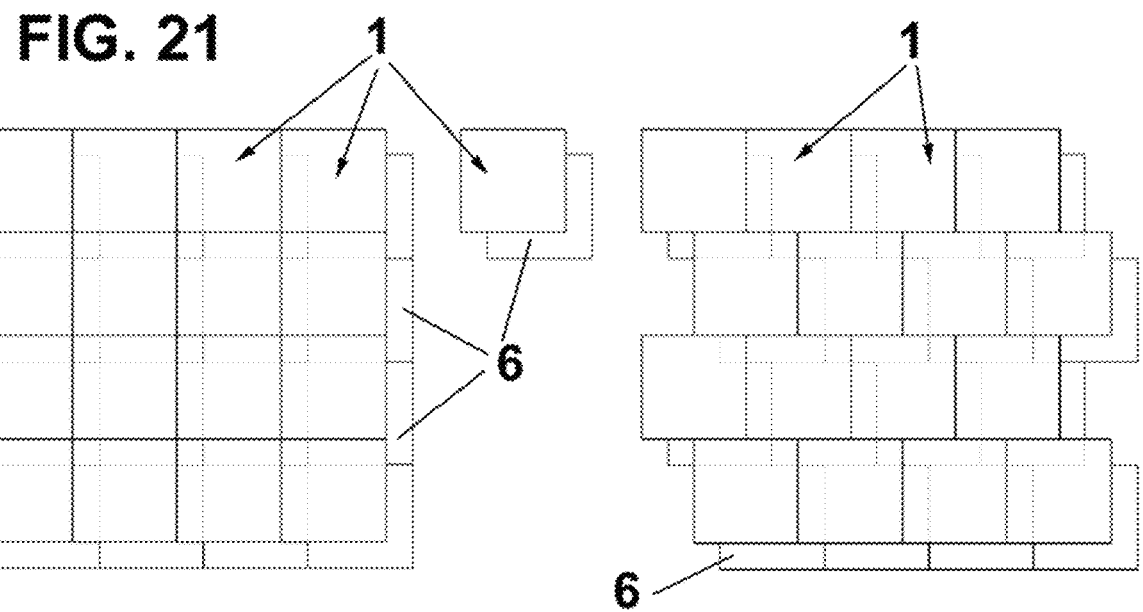

BRUSH MODULE FOR CONVEYOR BELTS

CROSS REFERENCE TO RELATED APPLICATIONS

The present application is the U.S. national phase application of, and claims the benefit of and priority to, International (PCT) Patent Appl. No. PCT/ES2022/070181, filed internationally on Mar. 29, 2022, which itself claims priority to European Patent Appl. No. 21382294.3, filed on Apr. 8, 2021. The entire disclosure of each of these applications is incorporated by reference as if set forth in their entirety herein.

The present invention relates to a brush module for the construction of conveyor belts, especially, but not exclusively, conveyor belts, machining and handling of laminar materials.

BACKGROUND OF THE INVENTION

Currently, brushes are known which, duly fixed to a set of mechanical elements, form a movable surface like an endless conveyor belt.

Said conveyor belts, in different industrial fields, are used to transport and/or manipulate elements that need to be elevated, or that cannot be in contact with a rigid or continuous surface.

There are brushes that comprise a plurality of brush modules having bristles mechanically attached to a support plate and multiple brush modules are linked to form a larger surface or conveyor belt.

The advantage of using bristle brush modules as a material conveying surface, instead of a smooth belt, lies in the fact that the materials deposited on top of it are virtually floating, allowing manipulations or machining that previously could not be done with automations or robots, since the tools of the manipulator or robot can, eventually, penetrate the bristles and access the part from its lower part.

This system has several drawbacks, such as the assembly difficulty, the manufacturing cost (fixing the bristles to a support plate), the weight (said support plate has to be thick to be able to fix the bristles well), the power required to move the conveyor belt (the higher the weight, the higher the power required), etc.

The bristle brush modules, preferably injected, molded or 3D printed, are manufactured in different materials with different hardness for different applications, ether cutting, handling or transport on an endless belt.

To create the conveyor belt, the bristle brush modules should be joined together, which is not easy, since said brush modules, individually and jointly, have to provide certain characteristics, in relation to their dimensions, resistance tensile strength, shear strength, regular bristle distribution and density, etc.

DESCRIPTION OF THE INVENTION

Therefore, an objective of the present invention is to provide a brush module, that multiple brush units can be easily joined together, providing high tensile and shear strength, and that in turn can have complementary thicknesses to facilitate assembly while keeping the final thickness.

With the brush module of the invention, the aforementioned drawbacks are solved, presenting other advantages that will be described below.

The brush module for conveyor belts according to the present invention comprises a base and a plurality of bristles, and also comprises a plurality of complementary protrusions and holes for engagement with one or more adjacent brush modules.

Advantageously, said protrusions and holes are complementary located in additional sections arranged at the ends or sides of the base. Said protrusions and holes may be located on both opposite surfaces of said additional sections.

According to two alternative embodiments, said additional sections may have a thickness that is a complementary proportion of the thickness of the base, so that when two or more brush modules are joined together, the thickness of the assembly is the same as the thickness of the base, or they may have a base thickness that is not constant as long as the top surface of the bristles is kept uniform.

According to an alternative embodiment, the attachment of two or more brush modules is carried out with an intermediate reinforcing piece, which in turn contains protrusions and holes complementary to the protrusions and holes of the additional sections of the brush modules.

Preferably, the protrusions protrude superiorly and inferiorly from said reinforcing intermediate piece.

Said protrusions can be of any suitable shape, for example they are shaped like an arrow, a harpoon, a mushroom, a tooth or a dovetail.

Said protrusions can have different shapes and sizes in the same brush module to fulfill different functionalities, such as the joint of different modules, the positioning of different modules to facilitate assembly, etc.

The base of the brush module may also comprise a plurality of through holes to facilitate cleaning or for the placement of additional pieces.

Said through holes in the base of the brush module allow the passage of a fluid that performs the deep cleaning of the bristles of the brush module, at the same time that it allows the use of vacuum flows for the improved holding of the objects transported on the conveyor belt.

Said additional pieces, preferably made of plastic materials, can fulfill different functions, to complement and improve the properties of the brush module or of the conveyor belt, either to improve the guidance of the conveyor belt, to improve the positioning of the brush modules, to improve the tensile of the conveyor belt, to improve the sliding of the conveyor belt, etc.

With the brush module according to the present invention, a great tensile and shear strength is achieved, and it makes it possible to manufacture self-supporting modular belts.

Furthermore, the joint between two brush modules, according to the present invention, can be reinforced by chemical (adhesive) and/or physical (welding) processes.

The brush module, according to the present invention, can be manufactured by over-injection of various materials or coupling by mechanical or chemical processes, so that the performance of the entire conveyor belt formed is increased, such as drag functions, tensile, reinforcement, sliding and guiding, among others, in addition to the function of joining the brush modules together.

The modularity of the brush modules for the construction of conveyor belts allows joining brush modules with complementary geometries, but also with intermediate reinforcement pieces, longitudinal stretch reinforcement bands, composite cables (Kevlar), etc.

The brush module according to the present invention allows the manufacture of conveyor belts that enable automations and robots to access an object from its lower part or fixation by means of a sharp object that penetrates the modular surface of bristles, enabling many cases where it would not be possible to pick it up by these methods.

The protrusions and these pieces can also be formed during a co-injection process of the brush module with one or more polymers of different properties.

BRIEF DESCRIPTION OF THE DRAWINGS

For a better understanding of what has been stated, some drawings are attached in which, schematically and only as a non-limiting example, a practical case of embodiment is represented.

FIG. 3 is a perspective view of a part of a second embodiment of two brush modules according to the present invention, before being joined together;

FIGS. 5 to 13 are elevation views of different embodiments of the brush module according to the present invention;

FIGS. 15 to 19 are elevation and perspective views of different embodiments of the brush module according to the present invention in which different pieces are shown performing different functions;

FIGS. 20a and 20b are a perspective plan view of an alternative embodiment according to the present invention;

FIG. 21 is a plan view of the assembly alternatives according to the present invention;

DESCRIPTION OF A PREFERRED EMBODIMENT

Figure 1:
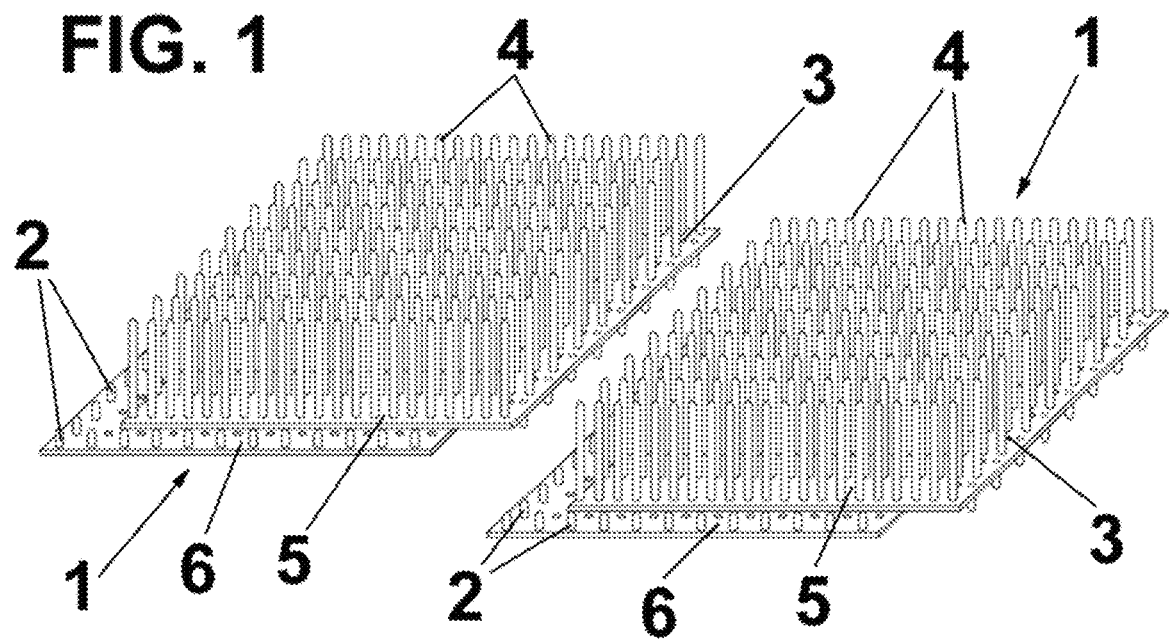
FIG. 1 is a perspective view of a part of a first embodiment of two brush modules according to the present invention, before being joined together.
Figure 2:
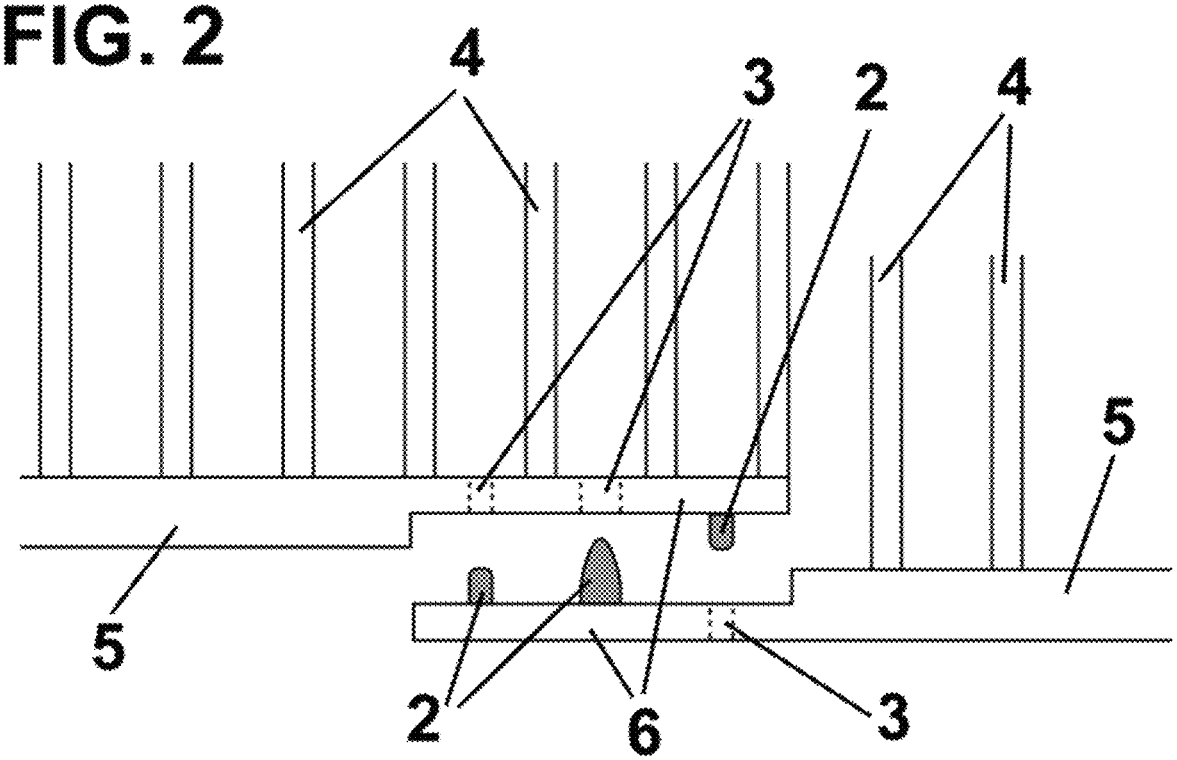
FIG. 2 is an elevation view of a part of the first embodiment of two brush modules according to the present invention, before being joined together.

FIGS. 1 and 2 show two brush modules 1 according to the present invention in accordance with a first embodiment.

According to this embodiment, two brush modules 1 are joined together by inserting protrusions 2 of a brush module 1 into holes 3 on an adjacent brush module 1, and so on until closing a loop, forming a self-supporting conveyor belt. This way of mechanical attachment between brush modules 1 works on a shearing basis.

As can be seen, each brush module 1 comprises a plurality of bristles 4, preferably made of an elastomeric material, protruding from a base 5.

These protrusions 2 and holes 3 are arranged in additional sections 6 at the ends or sides of the brush modules 1, the protrusions 2 and holes 3 engaging in a complementary manner, the additional sections 6 overlapping each other.

Said protrusions 2 and holes 3 are arranged in said additional sections 6 indistinctly, so that each additional section 6 of the same brush module 1 contains protrusions 2 and/or holes 3 in a complementary and opposite way to the other additional section 6 of the same brush module 1. In this way, when the different brush modules 1 are engaged, said additional sections 6 and their protrusions 2 and holes 3 are inserted in a complementary manner in both directions, forming a very shear-resistant joint.

These ends or sides can be straight or of different shapes, always complementary, to allow an improved bending to the advance of the belt that is formed when joining the brush modules 1, obtaining different geometries and designs of these brush modules 1 depending on the application to which this conveyor belt is intended.

FIG. 2 shows how said protrusions 2 can have different shapes and sizes, to facilitate insertion into holes 3.

It should be noted that protrusions 2 can be formed during a co-injection process when different polymers with different properties are used during injection of the brush module 1.

In FIG. 3 a second embodiment of the brush module 1 according to the present invention is shown. In this embodiment, a reinforcing intermediate piece 7 is used that joins two brush modules 1.

This intermediate reinforcing piece 7 is the one that comprises the protrusions 2 that are housed in complementary holes 3 of the brush module 1.

The protrusions 2 can be located on one face or on both faces of this intermediate reinforcing piece 7

Figure 4A:
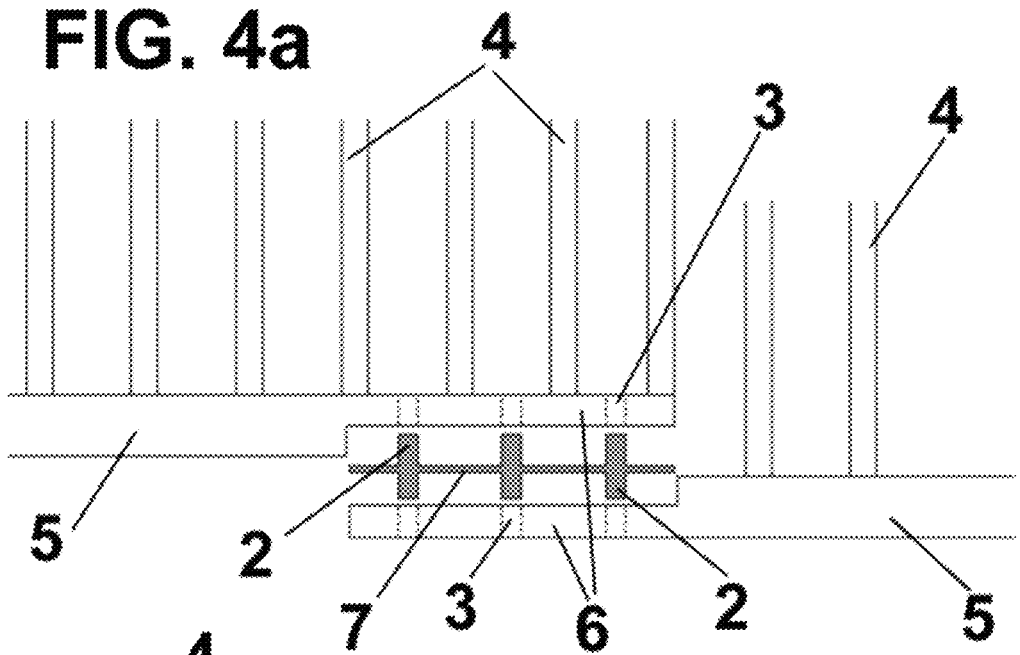
FIG. 4 is an elevation view of a part of the second embodiment of two brush modules according to the present invention, before being joined together.
Figure 4B:
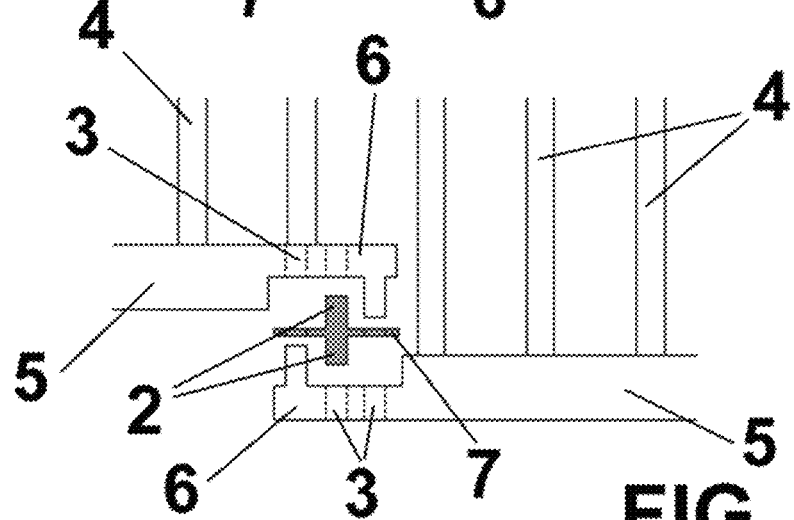
Figure 5:
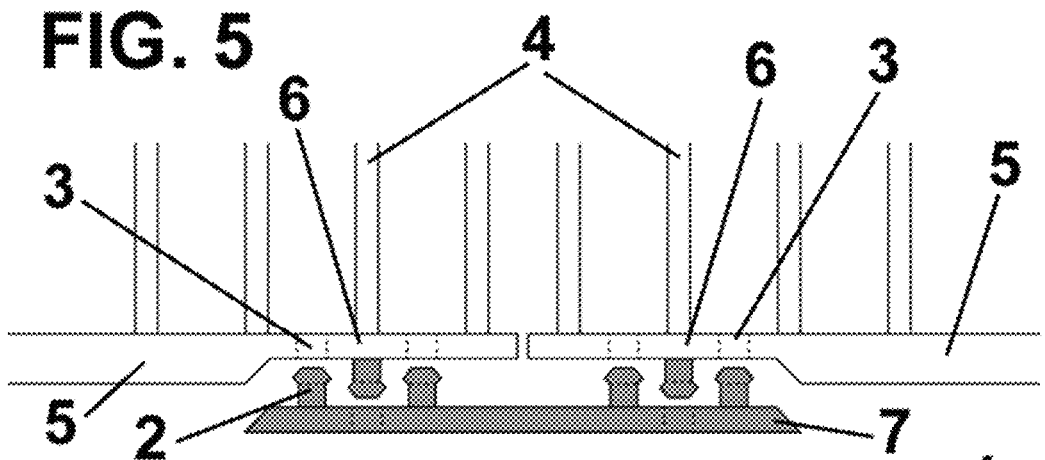
Figure 6:
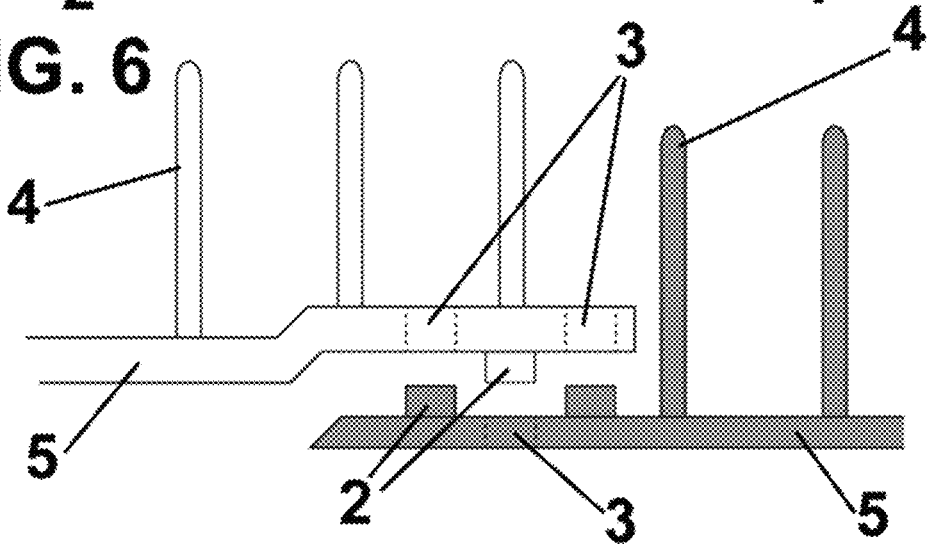

In FIG. 4 an alternative embodiment of the brush module 1 and of the intermediate reinforcement piece 7 is shown, wherein said intermediate reinforcement piece 7 may have protrusions 2 and holes 3.

The geometry of the protrusions 2 and of the complementary holes 3 may have a cylinder, arrow, harpoon or mushroom shape, or other shapes, as shown in FIGS. 5 to 11, thus allowing easy assembly and making it difficult for brush modules 1 to accidentally detach.

Figure 12:
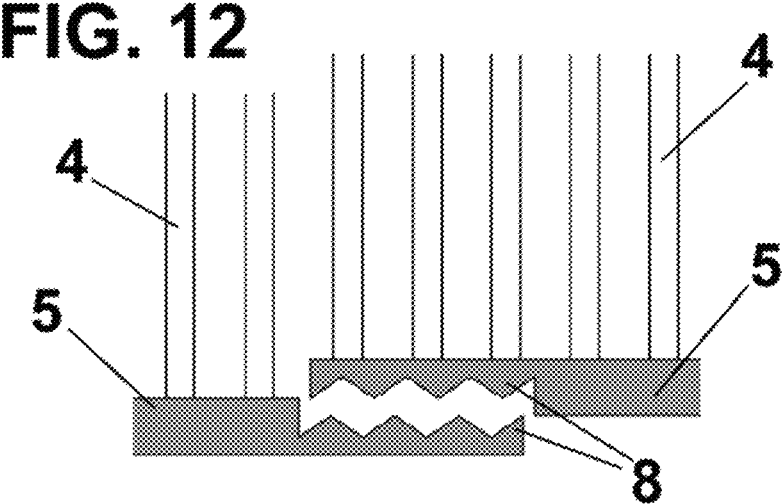
Figure 13:
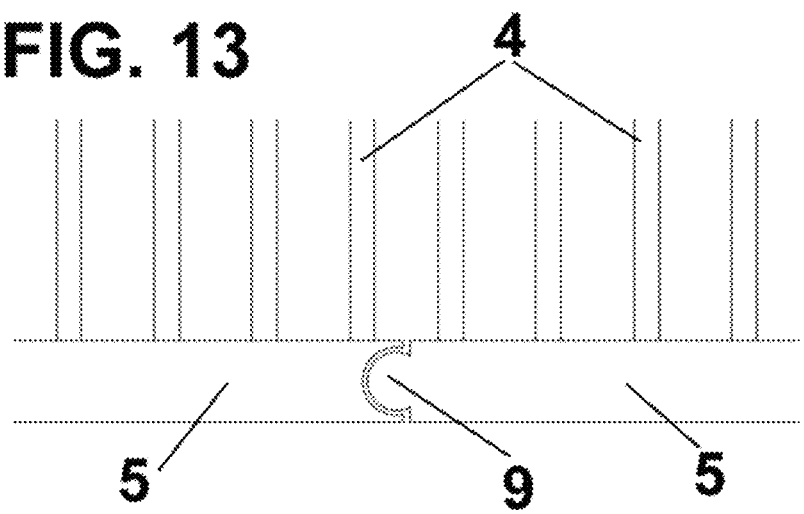

The union of two brush modules 1 can also be carried out by means of complementary teeth 8, as shown in FIG. 12, or by tongue-and-groove joint 9, as shown in FIG. 13.

In addition, the additional sections 6 of the brush modules 1, in which the holes 3 and protrusions 2 are alternately located, will have cutouts of complementary thicknesses to obtain a thickness equivalent to the rest of the brush module 1 once the brush modules 1 have been assembled together.

Figure 14A:
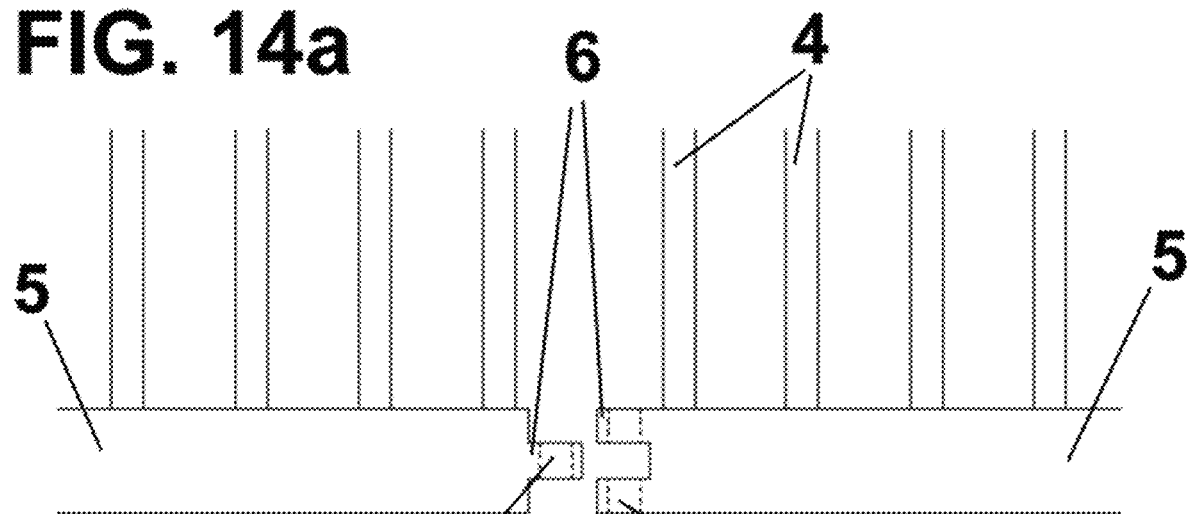
FIGS. 14a and 14b are perspective views of a part of a brush module according to the present invention, where through holes can be seen on the base, according to an alternative embodiment.
Figure 14B:
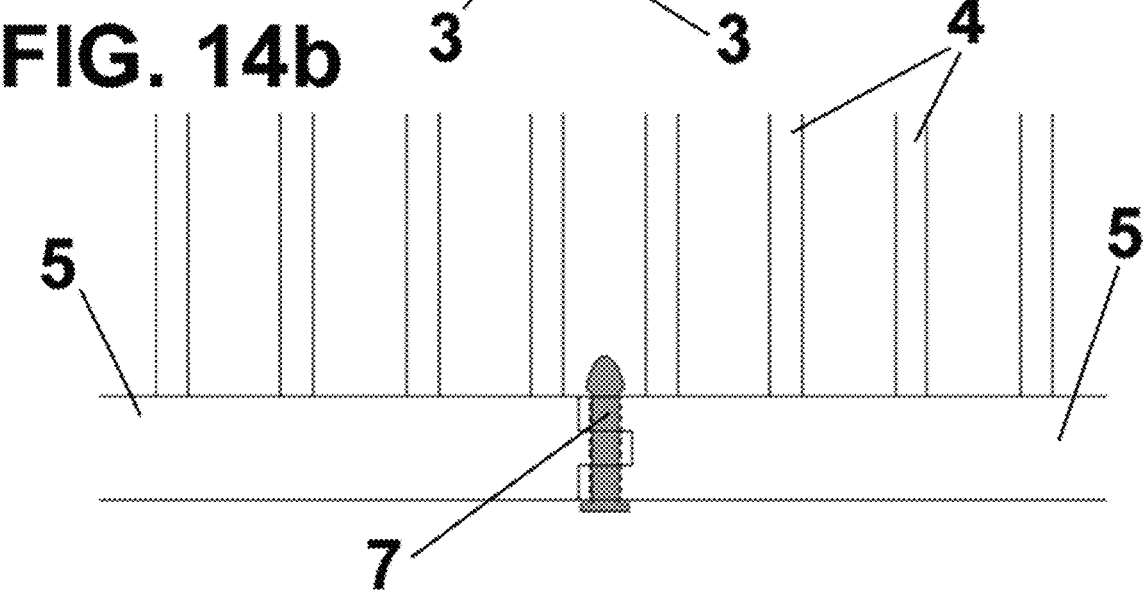

The additional sections 6 can be of one or more layers to favor a greater specific surface of contact that allows a more resistant joint to the tensile and to the shear force, as shown in FIGS. 14a and 14b.

Figure 15:
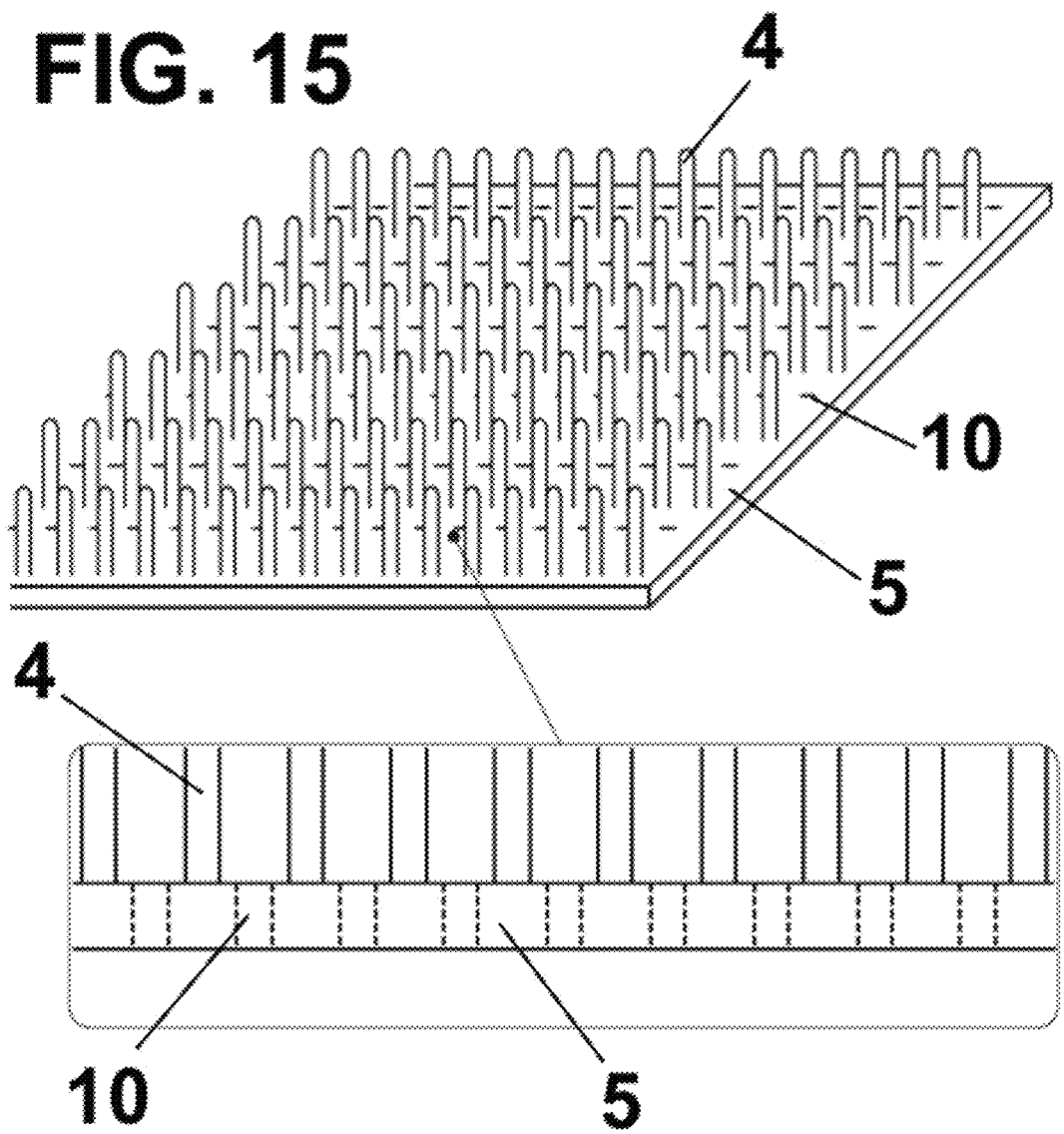

In turn, the base 5 of the brush modules 1 may comprise different through holes 10, located between the bristles 4, as shown in FIG. 15, which allow a flow to pass through them to facilitate cleaning of the brush modules 1 and also the application of flows (vacuum) to improve the stability of the objects deposited on the surface of the conveyor belt.

These through holes 10, depending on their arrangement, shape or diameter, also allow the addition to the base 5 of additional pieces 11, 12 and 13 (FIGS. 16 to 19) preferably made of plastic, mechanical materials, etc., managing by inserting these pieces in the through holes 10 to complement and improve the properties of the brush modules 1, and, therefore, of the conveyor belt once formed.

Figure 18:
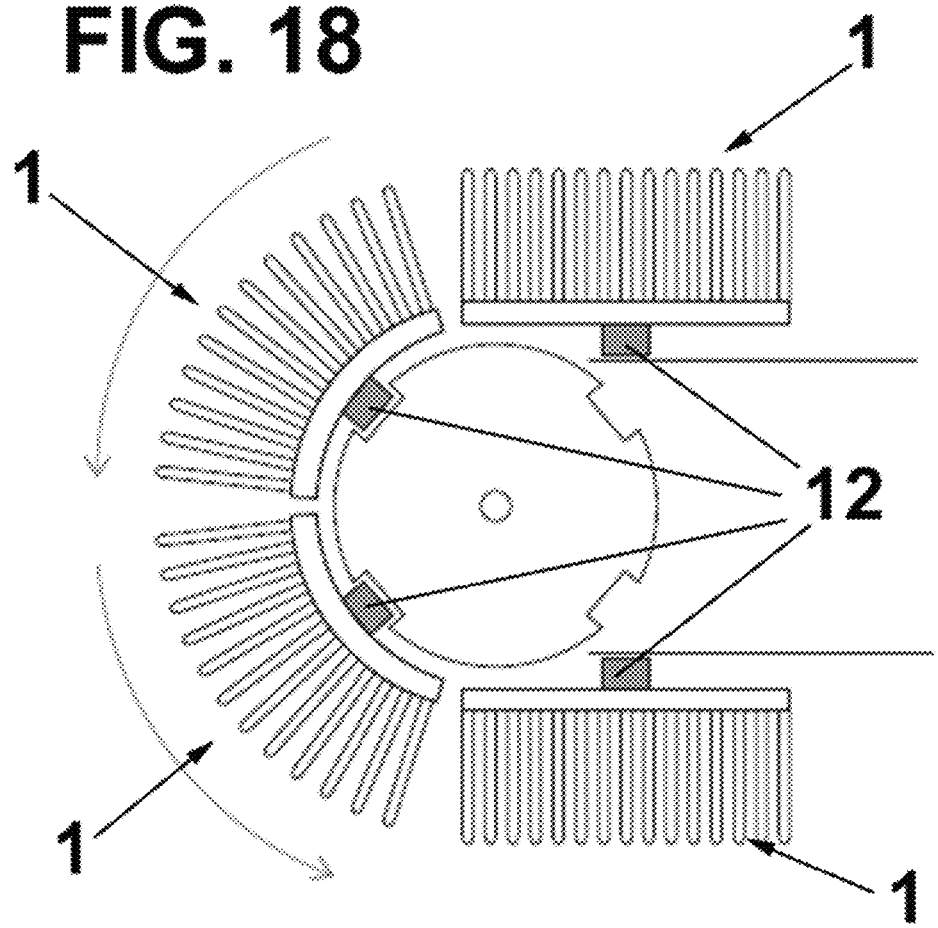
Figure 19:
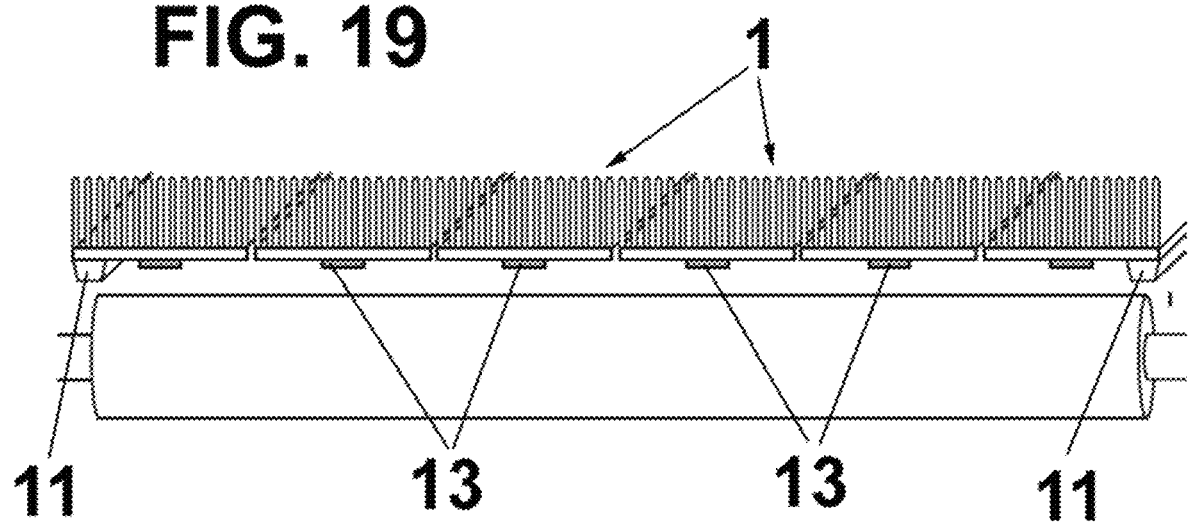

These insertion pieces can form guiding areas (insertion pieces 11, as seen in FIGS. 16a, 16b, 17a, 17b and 19), slide-like gliding (insertion pieces 13, as seen in FIG. 19), tensile areas (insertion pieces 12, as seen in FIG. 18) among other functions, with the purpose of reducing the friction force of the conveyor belt, or guiding or helping its tensile.

Alternatively, said insertion pieces can be formed during a co-injection process when different polymers with different properties are used during the injection of the brush module 1. In this case, said pieces would not be inserts, but would form part of the brush module 1 itself.

Furthermore, the front and rear peripheral sides of the brush module 1, that is, those corresponding to the direction of advance, can have different geometries depending on the tensile they support. For example, if less tensile force must be supported, these sides are preferably straight, and if they must support more tensile force, they present triangular or trapezoidal geometries, complementary between the brush modules 1, thus increasing the perimeter and the contact surface, as shown in FIGS. 20*a* and 20*b*.

The sides of the brush module 1 longitudinal to the direction of advance of the conveyor belt are preferably straight, since, when working parallel to the direction of advance, the fact of being a joint in a parallel straight line does not produce deformation.

At the assembly level, the brush modules 1 can be joined in straight grids, forming lines with superimposed modules, or in interleaved grids, the upper module fixing the halves of the lower modules. That is, each brush module 1 attached to two other brush modules 1, instead of one by one, as shown in FIG. 21.

To achieve these two assembly possibilities, the brush modules 1 can be sectioned in half, so that they can be configured to fill the gaps on the incomplete sides of the conveyor belt. The brush modules 1 can preferably have a longitudinal mechanical groove to facilitate the cutting operation. The right and left sides can also have complementary additional sections 6 with holes 3 and protrusions 2 to allow the joint of the brush modules 1.

In order to strengthen the joint between the brush modules 1 that form a conveyor belt, there may be incorporated, applied to bonding surfaces of additional sections 6, an adhesive 14 of the elastic synthetic type (thermoplastics, elastomers and thermoset materials such as polyurethane, silanes, moisture-cured silicones, pressure adhesives, contact adhesives, polyester, UV adhesives among others), natural elastic type (based on rubber, protein glues such as casein, gums or starches), or a joint with products that require a previous activation of the surface with plasma, or welding by radiofrequency or ultrasound, or other physical and chemical procedures, depending on its suitability to the final work environment to which it is directed.

Figure 22:
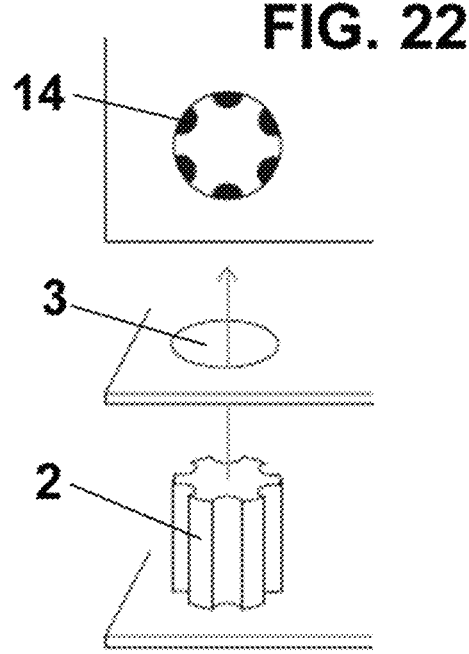
FIG. 22 is a detailed view of an alternative embodiment of the brush modules according to the present invention.

The protrusions 2 and holes 3, can have either geometries with gaps in the form of grooves or other designs in order to allow a homogeneous distribution of the adhesive 14, avoiding the expulsion by friction (rubber edge) of the adhesive during the insertion process, improving adherence, as can be seen in FIG. 22.

The resulting conveyor belt displacement is preferably accomplished by friction of the drive shaft against the lower surface of the brush modules, which make up the inner surface of the conveyor belt.

Figure 23:
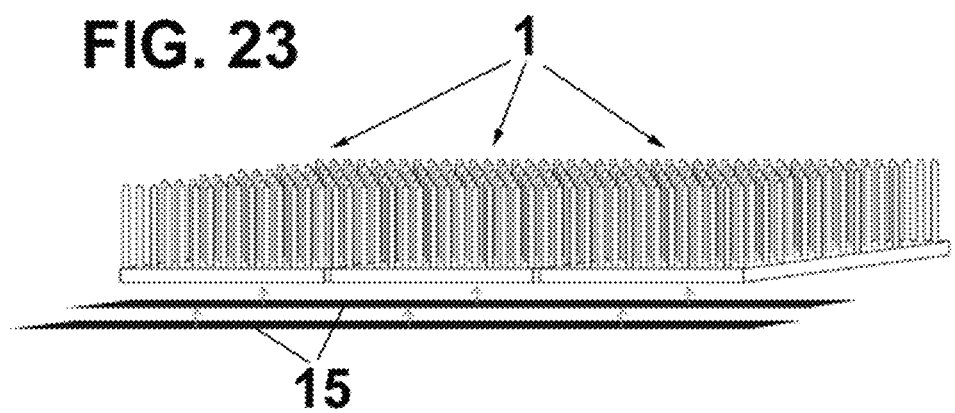
FIG. 23 is a perspective plan view of an alternative embodiment according to the present invention.

Complementarily and to avoid elongation of the conveyor belt due to use or other factors, reinforcements 15 can be incorporated, preferably although not only textiles, made up of fiber materials such as polyamides, composites, metal, etc. which are preferably joined on the base of the conveyor belt formed by said brush modules 1, as can be seen in FIG. 23.

Despite the fact that reference has been made to a specific embodiment of the invention, it is clear to a person skilled in the art that the described brush module is susceptible to numerous variations and modifications, and that all the mentioned details can be substituted by others technically equivalents, without departing from the scope of protection defined by the appended claims.

The invention claimed is:

1. A brush module for conveyor belts (1), comprising a base (5) and a plurality of bristles (4), characterized in that it also comprises a plurality of protrusions (2) and complementary holes (3) for their engagement with one or more adjacent brush modules (1), wherein the engagement of adjacent brush modules is reinforced with adhesive (14), ultrasound or high frequency and said holes (3) and protrusions (2) comprise longitudinal housings between the protrusions (2) and hole (3) for holding and regularly distributing the adhesive (14).

2. The brush module for conveyor belts (1) according to claim 1, wherein said holes (3) and protrusions (2) are located in a complementary and opposite way in additional sections (6) arranged at the ends or sides of the base (5).

3. The brush module for conveyor belts (1) according to claim 2, wherein said holes (3) and protrusions (2) are indistinctly distributed on both sides.

4. The brush module for conveyor belts according to claim 1, wherein said protrusions (2) and holes (3) are located on an intermediate reinforcement piece (7).

5. The brush module for conveyor belts according to claim 4, wherein the protrusions (2) project superiorly and inferiorly from said reinforcing intermediate piece (7).

6. The brush module for conveyor belts according to claim 1, wherein said protrusions (2) have the shape of an arrow, harpoon, mushroom, teeth or dovetail.

7. The brush module for conveyor belts (1) according to claim 1, wherein the base (5) comprises a plurality of through holes (10).

8. The brush module for conveyor belts according to claim 7, comprising one or more additional pieces (11, 12, 13).

9. The brush module for conveyor belts according to claim 8, wherein the additional pieces are additional guide pieces (11) of the conveyor belt.

10. The brush module for conveyor belts according to claim 8, wherein the additional pieces are additional tensile pieces (12) of the conveyor belt.

11. The brush module for conveyor belts according to claim 8, wherein the additional pieces are friction reduction additional pieces (13) of the conveyor belt.

\* \* \* \* \*